United States Patent
Meier

(10) Patent No.: US 8,434,663 B2
(45) Date of Patent: May 7, 2013

(54) PROCESS FOR MANUFACTURING A HONEYCOMB SEAL

(75) Inventor: Reinhold Meier, Dorfen (DE)

(73) Assignee: MTU Aero Engines GmbH, Munich (DE)

( * ) Notice: Subject to any disclaimer, the term of this patent is extended or adjusted under 35 U.S.C. 154(b) by 1323 days.

(21) Appl. No.: 11/578,875

(22) PCT Filed: Mar. 31, 2005

(86) PCT No.: PCT/DE2005/000565
§ 371 (c)(1),
(2), (4) Date: Aug. 20, 2007

(87) PCT Pub. No.: WO2005/102592
PCT Pub. Date: Nov. 3, 2005

(65) Prior Publication Data
US 2008/0135602 A1    Jun. 12, 2008

(30) Foreign Application Priority Data
Apr. 20, 2004 (DE) .......................... 10 2004 018 994

(51) Int. Cl.
*B23K 101/02* (2006.01)

(52) U.S. Cl.
USPC ........... 228/121; 228/178; 228/182; 228/188; 228/199; 228/200

(58) Field of Classification Search ........... 228/157, 228/181
See application file for complete search history.

(56) References Cited

U.S. PATENT DOCUMENTS

| | | | | |
|---|---|---|---|---|
| 2,966,423 A | * | 12/1960 | Shichman | 427/449 |
| 3,053,694 A | * | 9/1962 | Daunt et al. | 427/230 |
| 3,068,016 A | * | 12/1962 | Dega | 277/406 |
| 4,395,196 A | * | 7/1983 | Plautz | 415/174.4 |
| 4,405,284 A | | 9/1983 | Albrecht et al. | |
| 5,205,465 A | * | 4/1993 | Bogard et al. | 228/119 |
| 6,485,025 B1 | * | 11/2002 | Hammersley et al. | 277/414 |
| 2005/0005444 A1 | * | 1/2005 | Bostanjoglo et al. | 29/889.2 |

FOREIGN PATENT DOCUMENTS

| | | |
|---|---|---|
| CH | 478 363 | 9/1969 |
| DE | 196 31 038 | 2/1998 |
| DE | 102 38 551 | 3/2004 |
| FR | 2 258 524 | 8/1975 |

* cited by examiner

*Primary Examiner* — Erin Saad
(74) *Attorney, Agent, or Firm* — Crowell & Moring LLP

(57) ABSTRACT

A process for manufacturing a honeycomb seal is disclosed. The process includes the following steps: a) the honeycomb structure is brought to the desired three-dimensional form and is fixed in this form; b) then the honeycomb structure is filled with a filler material; c) then the honeycomb structure filled with the filler material is machined on a side on which a carrier element is arranged, such that this side has the desired contour and that the end edges of the honeycomb structure are sealed flushly with the filler compound; d) then the side contoured in this way is coated with a coating; e) next the carrier element is applied to the coating, preferably by laser powder build-up welding.

21 Claims, 1 Drawing Sheet

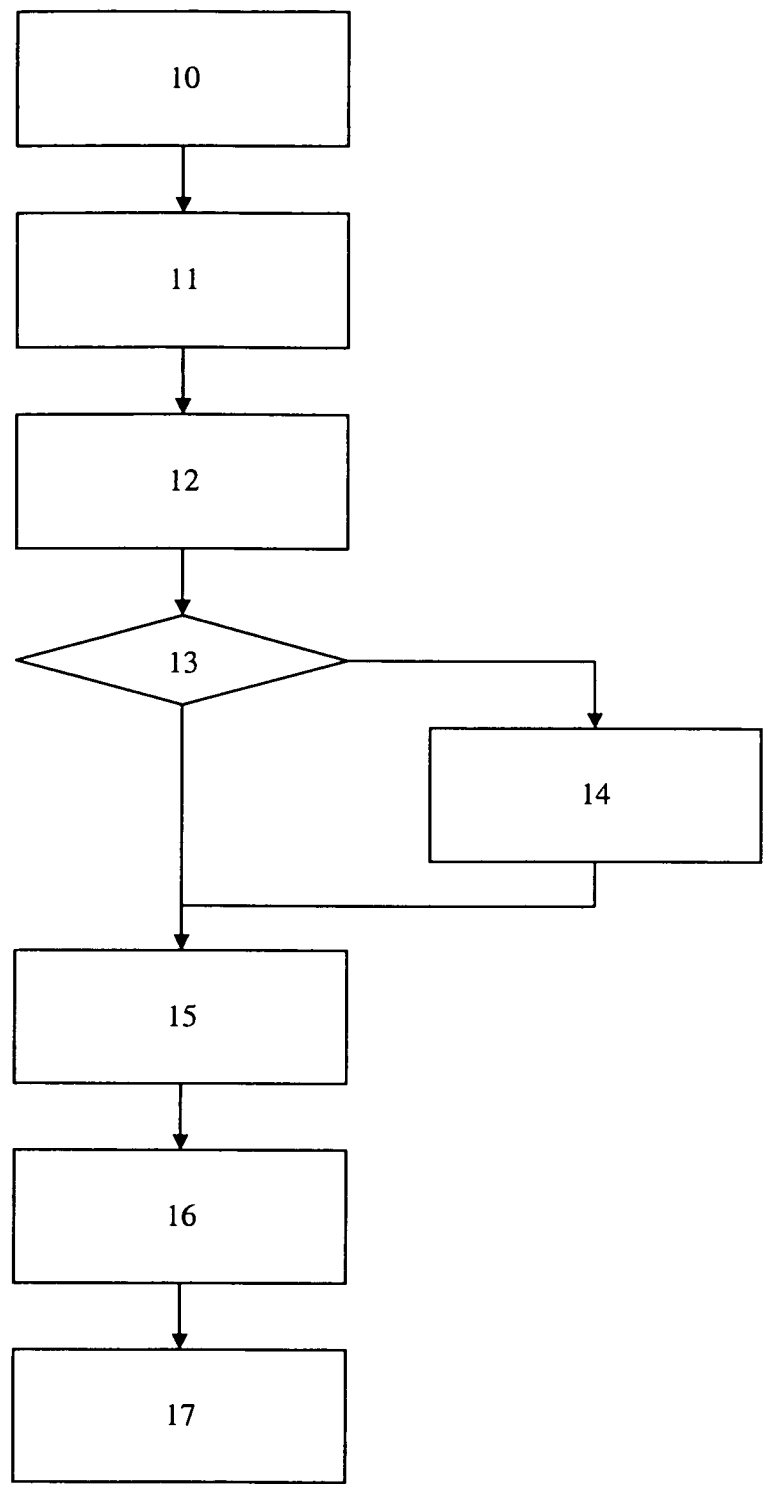

PROCESS FOR MANUFACTURING A HONEYCOMB SEAL

This application claims the priority of International Application No. PCT/DE2005/000565, filed Mar. 31, 2005, and German Patent Document No. 10 2004 018 994.3, filed Apr. 20, 2004, the disclosures of which are expressly incorporated by reference herein.

BACKGROUND AND SUMMARY OF THE INVENTION

The invention relates to a process for manufacturing a honeycomb seal, whereby the honeycomb seal has a honeycomb structure comprising multiple honeycombs, whereby the honeycomb structure is designed to be open on one side, namely on the sealing side, and whereby the honeycomb structure on a side opposite the sealing side is sealed by a carrier element and is fixedly connected to same.

German Patent Document No. DE 196 31 038 C2 discloses a process for manufacturing a honeycomb seal, whereby the honeycomb seal consists of a carrier part and/or a carrier element and a honeycomb element and/or a honeycomb structure. According to the process disclosed there, the carrier part is first positioned on a supporting device and is thereby brought to the desired three-dimensional form, and then the honeycomb element is placed on the carrier part. After pressing the honeycomb element against the carrier part, tack spot welding is performed on the contact surface of the carrier part and the honeycomb element at a fixed number of spots, with protective gas being injected at the tack points. The final attachment of the honeycomb element to the carrier part is accomplished by soldering in the sense described in DE 196 31 038 C2.

In particular when a honeycomb element and/or a honeycomb structure made of an FeCrAlY material is to be joined to a carrier part and/or a carrier element made of a nickel-based alloy or a cobalt-based alloy, there are problems in soldering together the honeycomb element and the carrier part, in particular. Thus, with such pairings of materials in particular, soldering must be performed at very high temperatures and at a pressure below $10^{-5}$ bar, preferably in a vacuum. Such extreme operating conditions in soldering lead to high manufacturing costs and also entail high manufacturing risks.

Against this background, the object of the present invention is to create a novel process for manufacturing a honeycomb seal.

According to this invention, the process includes the following steps: a) the honeycomb structure is brought to the desired three-dimensional form and is fixed in this form; b) then the honeycomb structure is filled with a filler material; c) then the honeycomb structure filled with filler material is machined on the side where the carrier element is to be arranged, such that this side has the desired contour and that the end edges of the honeycomb structure are sealed flushly with the filler compound; d) then the side contoured in this way is coated with a coating; e) then the carrier element is applied to the coating, preferably by laser powder build-up welding.

According to an advantageous development of this invention, in step b) the honeycomb structure is filled with an electrically conductive filler material, in particular with conductive wax, while in step d) the contoured side is coated with an adhesive layer for the carrier element.

BRIEF DESCRIPTION OF THE DRAWINGS

Preferred developments of the invention are derived from the description hereinafter. An exemplary embodiment of the invention is illustrated in greater detail with reference to the drawing without being limited thereto.

FIG. 1 is a flow chart of the inventive process for manufacturing a honeycomb seal.

DETAILED DESCRIPTION OF THE DRAWINGS

Referring to FIG. 1, the inventive process is described in greater detail below, whereby FIG. 1 shows a schematic flow-chart of the inventive process for manufacturing a honeycomb structure.

In a first step of the inventive process according to block 10 in FIG. 1, a honeycomb structure comprising multiple honeycombs and designed to be open on both sides of the honeycomb is brought to the desired three-dimensional form and/or the required geometry of the honeycomb seal to be produced. The honeycomb structure is secured and/or held in this desired three-dimensional form and/or in the required geometry.

In this context it should be pointed out that the honeycomb structure and/or the honeycombs thereof are typically formed, i.e., manufactured, from an MCrAlY material, in particular from an FeCrAlY material.

After the honeycomb structure comprising multiple honeycombs has been brought to the desired three-dimensional form and secured in this form, the honeycomb structure is filled with a filler material in the sense of block 11 in a second step of the inventive process. This filler material may be wax, especially electrically conductive wax, or also polystyrene, in particular electrically conductive polystyrene. The honeycomb structure here is completely filled with the filler material.

Following this, in the next step of the inventive process in the sense of block 12, the honeycomb structure filled with the filler material is machined on the side of the honeycomb structure on which the carrier element of the honeycomb seal is to be situated later, the machining being such that this side exhibits the desired profiling and/or the desired contour. In doing so, the honeycombs are cut and exposed on this side in such a way that the end edges of the honeycombs and/or the honeycomb structure are sealed with the filler compound so they are flush and are thus freely accessible and/or exposed.

If, in block 11 of the inventive process, the honeycomb structure has been filled with an electrically conductive filler, in particular conductive wax, then the process can branch off directly to block 15 of the inventive process and the side of the honeycomb structure that has been filled with filler material and contoured in block 12 can be coated with a coating. In doing so, a metallic adhesive layer for the carrier element of the honeycomb seal is applied to the contoured side of the honeycomb structure filled with filler material. Preferably this contoured side is electroplated with nickel, i.e., by electrolytic means, in block 15. The test of whether the honeycomb structure was filled with an electrically conductive filler in block 11 is represented by block 13 in FIG. 1.

It should be pointed out here that if the metallic adhesive layer is to be applied to the contoured side by electroplating with nickel on this side in block 15 and if the honeycombs have been filled with an electrically nonconductive filler in block 11, then the surface of the side of the honeycomb structure filled with filler material and contoured in block 12 is rendered conductive in the sense of block 14 prior to electroplating with nickel in block 15, e.g., by coating.

In addition, it should be pointed out that the coating operation, in particular the nickel plating of the contoured side of the honeycomb structure filled with filler material in the sense of block 15 can also be performed by a chemical process and therefore without electric current. In this case, the process branches off directly from block 12 to block 15 even if the honeycomb structure has been filled with an electrically non-conductive filler material in block 11 of the inventive process.

Following the application of the metallic adhesive layer to the contoured side of the honeycomb structure filled with filler material in the sense of block 15, the carrier element of the honeycomb seal is applied to the metallic adhesive layer by laser powder build-up welding in a next step of the process. This is illustrated by block 16. In the sense of the present invention, the carrier element of the honeycomb seal is thus manufactured, i.e., fabricated, only in the laser powder build-up welding step and it is not soldered to the honeycomb structure as a finished modular group, as is done in prior art.

In terms of the present invention, the carrier element of the honeycomb seal is preferably manufactured by laser powder build-up welding of a nickel-based alloy material or a cobalt-based alloy material or an iron-based alloy material to the metallic adhesive layer.

Following the manufacture of the carrier element of the honeycomb seal by laser powder build-up welding, a final machining of the honeycomb seal manufactured in this way is preferably performed in the sense of block 17. Referring to this final machining, in block 17 the filler material can be removed from the honeycomb structure through the open sealing side thereof. Furthermore, the outside contours of the honeycomb structure may also be machined to the final contour. In addition, connecting elements may also be inserted into the honeycomb seal and/or attached thereto in order to easily and reliably install the honeycomb seal in the area of a sealing site.

With the inventive process, it is possible to manufacture honeycomb seal segments having the cross-sectional form of circular segments or annular segments in that a honeycomb structure is brought into a closed ring structure in the step according to block 10 of the inventive process and in that all the subsequent process steps are performed in the sense of blocks 11 through 17 on this ring structure. Following the manufacture of such an annular honeycomb seal, it is possible to provide ring-segment-shaped honeycomb seal segments by separating the annular honeycomb seal.

By means of the inventive process described here, a simple, cost-effective and reliable manufacture of honeycomb seals has been suggested.

The invention claimed is:

1. A process for manufacturing a honeycomb seal, wherein the honeycomb seal has a honeycomb structure comprising multiple honeycombs, wherein the honeycomb structure is open on a sealing side, and wherein the honeycomb structure is sealed by a carrier element on a side opposite the sealing side and is fixedly connected to the same, comprising the steps of:
   a) forming the honeycomb structure in a three-dimensional form and fixing the honeycomb structure in the form;
   b) filling the honeycomb structure with a filler material;
   c) machining the honeycomb structure filled with the filler material on the side on which the carrier element is to be arranged, so that the side on which the carrier element is to be arranged has a desired contour and that end edges of the honeycomb structure are sealed such that they are flush with the filler material;
   d) coating the contoured side with a coating; and
   e) applying the carrier element to the coating.

2. The process according to claim 1, wherein in conjunction with step b), the honeycomb structure is filled with an electrically conductive filler material.

3. The process according to claim 2, wherein the electrically conductive filler material is a conductive wax.

4. The process according to claim 1, wherein in conjunction with step b), the honeycomb structure is filled with a filler material which is not electrically conductive, and further comprising the step of making a surface of the contoured side electrically conductive after step c) and before step d).

5. The process according to claim 1, wherein in conjunction with step d), the contoured side is coated with an adhesive layer for the carrier element.

6. The process according to claim 1, wherein in conjunction with step d), the contoured side is nickel-plated.

7. The process according to claim 1, wherein in conjunction with step e), the carrier element is applied to the coating by laser powder build-up welding.

8. The process according to claim 1, wherein following step d) or following step e), the filler material is removed from the honeycomb structure through the open sealing side.

9. The process according to claim 1, wherein the honeycomb structure is formed from an MCrAlY alloy.

10. The process according to claim 9, wherein the MCrAlY alloy is an FeCrAlY alloy.

11. The process according to claim 1, wherein the carrier element is made of a nickel-based alloy or a cobalt-based alloy or an iron-based alloy.

12. A process for manufacturing a honeycomb seal, comprising the steps of:
   forming a honeycomb structure in a three-dimensional form;
   filling the honeycomb structure with a filler material;
   machining the honeycomb structure filled with the filler material on a side such that the side has a contour;
   coating the contoured side with a coating; and
   applying a carrier element to the coating.

13. The process according to claim 12, wherein the carrier element is applied to the coating by laser powder build-up welding.

14. The process according to claim 12, wherein the filler material is electrically conductive.

15. The process according to claim 14, wherein the filler material is a conductive wax.

16. The process according to claim 12, further comprising the step of removing the filler material from the honeycomb structure.

17. The process according to claim 12, wherein the filler material is non-electrically conductive and further comprising the step of making a surface of the contoured side electrically conductive.

18. The process according to claim 12, further comprising the step of inserting a connecting element into the honeycomb structure.

19. The process according to claim 12, wherein the three-dimensional form is a closed ring structure.

20. A process for manufacturing a honeycomb seal, comprising the steps of:
   forming a honeycomb structure in a three-dimensional form;
   filling the honeycomb structure with a filler material;
   machining the honeycomb structure filled with the filler material on a side such that the side has a contour;
   coating the contoured side with a coating; and
   fabricating a carrier element on the coating.

21. The process according to claim 20, wherein the carrier element is fabricated by a laser powder build-up welding process.

* * * * *